Aug. 6, 1957   S. M. PASS   2,802,074
CUT-OFF SWITCH FOR TRACTOR
Filed March 7, 1956
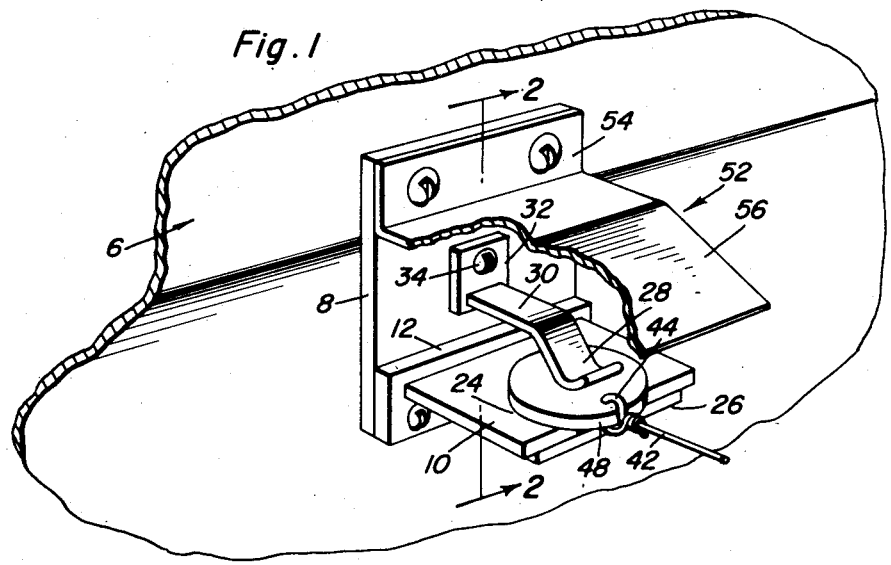
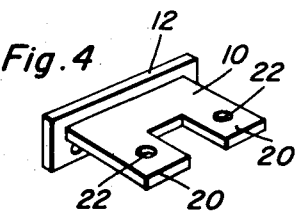
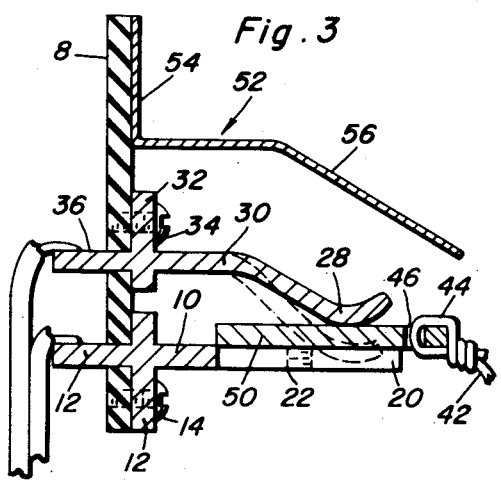
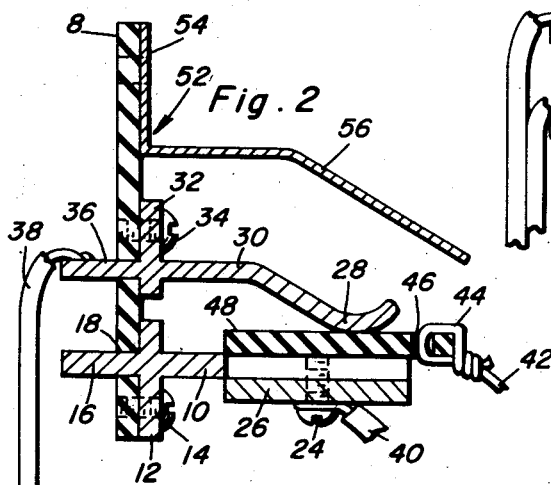
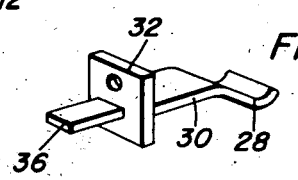
Sidney M. Pass
INVENTOR.
BY *Clarence A. O'Brien*
*and Harvey B. Jacobson*
Attorneys

United States Patent Office 2,802,074
Patented Aug. 6, 1957

2,802,074

CUT-OFF SWITCH FOR TRACTOR

Sidney M. Pass, Pensacola, Fla.

Application March 7, 1956, Serial No. 570,057

3 Claims. (Cl. 200—61.19)

The present invention relates to a safety-type circuit make and break device or switch which is designed to serve as an emergency device on a farm tractor or the like, it being the purpose of the invention to shut off and stop the motor of the tractor under certain predetermined conditions.

It is a matter of common knowledge that many farmers when driving tractors stand up for short periods in order to relax and take an occasional stretch and there are times under these circumstances that a farmer may fall or by accident be thrown from either the seat or a standing position and this has posed the problem of providing means to, under these circumstances, stop the engine. To be sure, so-called emergency-type safety controls which function as engine cut-outs if a tractor overturns or a similar emergncy situation is met are old and, considering the prior art, it can be said that these are of many and varied styles, forms and types.

The purpose of the instant invention is to provide a simple, practical and highly economical switch which may be mounted on the dashboard of a tractor or an equivalent suitable place and which is characterized by a flexible element which is normally slack and has one end attached to the belt of the driver and which functions to the trip cord and has its opposite end connected with one of the components or parts of the switch so that when the trip cord is tautened to a predetermined degree, by the driver falling or being dislodged from the seat, the switch comes into play and stops the engine to minimize the injuries and damages which might otherwise occur.

Other objects, features and advantages of the invention will become more readily apparent from the following description and the accompanying sheet of illustrative drawings.

In the drawings, wherein like numerals are employed to designate like parts throughout the views:

Figure 1 is a perspective view of a safety cut-off switch for a tractor constructed in accordance with the invention and showing how it is used;

Figure 2 is a section on the plane of the vertical line 2—2 of Figure 1 looking in the direction of the arrows;

Figure 3 is a similar view showing a modified form of the invention; and

Figures 4 and 5 are perspective views of certain of the details.

Referring now to the drawings and to Figure 1 in particular, the dashboard or instrument panel or other equivalent part of the tractor is denoted by the numeral 6 and it is on this part that the safety switch is mounted. The switch (see Figs. 1 and 2) comprises a baseplate which is preferably a panel of insulation 8 and this is bolted or otherwise fastened to the instrument panel. There is a contact member which is here described more specifically as a shelf-like plate 10 and this has a flange 12 which is bolted at 14 to the lower portion of the base 8 in the manner seen in Fig. 2. There is a prong-like extension 16 extending through a hole provided therefor as at 18. This plate is bifurcated and the furcations are denoted by the numerals 20, the latter being provided with screw threaded holes 22 which serve to accommodate screws 24 (see Fig. 2) extending through the furcations and also through a bridge plate 26 which spans the space between the furcations and cooperates therewith in defining a relatively fixed contact to accommodate the flexible end portion 28 of the relatively movable contact finger 30. This has a flange 32 abutting the base secured thereto by a fastener 34. There is also an extension 36 which as shown in Fig. 2 serves to permit the end of a conductor wire 38 to be attached thereto. The numeral 40 in the same figure designates a ground wire. The trip cord or flexible element is denoted at 42 and has a looped end 44 connected with an aperture 46 provided in the insulated disc 48 which is interposed between the contact elements as shown in Fig. 2. This arrangement is for operation on a magneto-type ignition system and hence if the rider should fall off of the tractor, the plastic or insulated disc 48 which is actuated by the trip board 42 would be pulled from its place between the contacts and the contact finger 28 would press downward and come into contact with the underlying metallic contact plate 26 and this would ground the magneto and stop the engine.

A similar arrangement is used for the battery ignition construction shown in Fig. 3 and therefore the same elements which designate corresponding parts are used in both Figs. 2 and 3. It is to be pointed out here that the plate 26 of this arrangement is omitted. Also instead of using a trip cord actuated disc of insulation, the disc here is of metal and is denoted by the numeral 50. The safety line 42 is attached to the rider and to the metal disc. If the rider should fall off the tractor the safety line will pull the metal disc 50 free of the contacts between which it is sandwiched. The contact finger 28 in this instance will, of course, press downward but since there is no plate 26 beneath, it will simply enter the space or slot between the furcations and this will result in opening the battery circuit to the distributor and stopping the engine, as is obvious.

In both forms of the invention, a suitable shield 52 is provided and this has an attaching flange 54 and an appropriate visor-like shield plate 56 which overlies the contact members and affords a certain amount of protection. Of course, the device might be otherwise encased in a more elaborate construction.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a safety engine cut-out switch for use on a tractor, a base plate adapted to be mounted on an instrument panel or the like, a relatively stationary contact plate mounted on said base plate and extending at right angles therefrom and bifurcated and providing a pair of furcations, a contact finger having one end mounted on said base plate and extending laterally therefrom in a position above said contact plate, said finger having a free end resilient portion disposed above the space existing between the furcations, and a disc removably mounted between said furcations and finger, together with a trip cord connected at one end with said disc and adapted to be connected at its other end with the belt or other part of the driver of a tractor.

2. The structure defined in claim 1 and wherein said disc is of insulation material, and the combination therewith of a metal bridge plate fastened to the underneath portions of said furcations and bridging the space between the furcations.

3. An emergency engine stopping switch for a tractor or the like comprising a relatively fixed contact plate, a complemental contact finger having a resilient portion movable toward and from a cooperating portion of said plate, a flexible trip cord one end of which is adapted to be connected with the rider of a tractor, and a second make and break element sandwiched in between said finger and plate and adapted to be withdrawn and dislodged when sufficient tension is exerted on the trip cord, said plate being bifurcated and thus providing spaced furcations, and a bridge plate underlying said plate and spanning the space between the furcations and detachably mounted on said furcation.

References Cited in the file of this patent

UNITED STATES PATENTS

| | | |
|---|---|---|
| 1,988,330 | Pettersson et al. | Jan. 15, 1935 |
| 2,376,330 | Dircksen et al. | May 22, 1945 |
| 2,722,575 | Dobkins | Nov. 1, 1955 |
| 2,725,947 | Dooley | Dec. 6, 1955 |